(12) United States Patent
Pang et al.

(10) Patent No.: US 11,036,026 B2
(45) Date of Patent: Jun. 15, 2021

(54) APPARATUS AND METHOD CONTROLLING POSITION OF CAMERA MODULE WITH A SINGLE COIL

(71) Applicant: Samsung Electro-Mechanics Co., Ltd., Suwon-si (KR)

(72) Inventors: Sung Man Pang, Suwon-si (KR); Youn Joong Lee, Suwon-si (KR); Ja Hwi Cho, Suwon-si (KR); Je Hyeon Yu, Suwon-si (KR); Jin Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 184 days.

(21) Appl. No.: 16/035,968

(22) Filed: Jul. 16, 2018

(65) Prior Publication Data

US 2019/0154955 A1 May 23, 2019

(30) Foreign Application Priority Data

Nov. 22, 2017 (KR) ........................ 10-2017-0156703

(51) Int. Cl.
*G02B 7/08* (2021.01)
*H04N 5/232* (2006.01)
(Continued)

(52) U.S. Cl.
CPC ................. *G02B 7/08* (2013.01); *G03B 5/00* (2013.01); *G03B 13/36* (2013.01); *H04N 5/2253* (2013.01); *H04N 5/232* (2013.01); *G02B 27/646* (2013.01)

(58) Field of Classification Search
CPC ...... G02B 7/08; G02B 27/646; G02B 13/001; H04N 5/2254; H04N 5/23241;
(Continued)

(56) References Cited

U.S. PATENT DOCUMENTS 9,893,650 B2  2/2018  Sumioka
2013/0120648 A1  5/2013  Oh
(Continued)

FOREIGN PATENT DOCUMENTS

CN  103998275 A  8/2014
CN  106469998 A  3/2017
(Continued)

OTHER PUBLICATIONS

Korean Office Action dated Feb. 21, 2019 in corresponding Korean Patent Application No. 10-2017-0156703 (4 pages in English, 4 in Korean).
(Continued)

*Primary Examiner* — Marin Pichler
*Assistant Examiner* — Mitchell T Oestreich
(74) *Attorney, Agent, or Firm* — NSIP Law

(57) ABSTRACT

An apparatus controlling a position of a camera module includes an operating coil disposed on a housing of the camera module to face a magnetic member disposed on a lens barrel of the camera module, a driving circuit providing a driving current to the operating coil, a capacitor circuit having a capacitor value to form a resonance circuit together with the operating coil to resonate at a resonance frequency varied depending on an inductance value of the operating coil; a resonance maintaining circuit maintaining a level of a resonance signal generated by the operating coil and the capacitor circuit, a resonance frequency detecting circuit detecting a resonance frequency signal from the resonance signal generated by the operating coil and the capacitor circuit, and a control circuit configured to control the driving circuit in response to the resonance frequency signal from the resonance frequency detecting circuit.

13 Claims, 11 Drawing Sheets

(51) Int. Cl.
*H04N 5/225* (2006.01)
*G03B 5/00* (2021.01)
*G03B 13/36* (2021.01)
*G02B 27/64* (2006.01)

(58) Field of Classification Search
CPC ........ H04N 5/2253; H04N 5/232; G03B 5/00; G03B 13/36
USPC ....................................................... 359/694
See application file for complete search history.

(56) References Cited

U.S. PATENT DOCUMENTS

| | | |
|---|---|---|
| 2014/0347075 A1 | 11/2014 | Goto et al. |
| 2017/0054387 A1* | 2/2017 | Sumioka ................ H02N 2/008 |
| 2018/0278853 A1 | 9/2018 | Ryu et al. |

FOREIGN PATENT DOCUMENTS

| | | |
|---|---|---|
| CN | 108668056 A | 10/2018 |
| EP | 2 078 981 A1 | 7/2009 |
| JP | 2009-271204 A | 11/2009 |
| KR | 10-1166418 B1 | 7/2012 |
| KR | 10-2014-0088308 A | 7/2014 |
| KR | 10-2015-0054057 A | 5/2015 |

OTHER PUBLICATIONS

Chinese Office Action dated Nov. 2, 2020 in counterpart Chinese Patent Application No. 201811265748.9 (13 pages in English, 10 pages in Chinese).

\* cited by examiner

APPARATUS AND METHOD CONTROLLING POSITION OF CAMERA MODULE WITH A SINGLE COIL

CROSS-REFERENCE TO RELATED APPLICATION

This application claims the benefit under 35 USC 119(a) of Korean Patent Application No. 10-2017-0156703 filed on Nov. 22, 2017 in the Korean Intellectual Property Office, the entire disclosure of which is incorporated herein by reference for all purposes.

BACKGROUND

1. Field

The present disclosure relates to an apparatus and method controlling a position of a camera module with a single coil.

2. Description of Related Art

Camera modules, associated with mobile phones, may have a slim size and capture high resolution images. For such characteristics, a lens that has a high aspect ratio may be mounted in the camera module, to perform functions such as, for example, autofocusing and optical image stabilization (OIS), in the camera module. However, in order to perform the autofocusing or the OIS functions, an accurate position of the camera module and an accurate current position value typically have to be determined.

As an existing or typical technology, a method of performing position control using a hall sensor and a magnet for sensing a position may be used.

When an existing hall sensor approach is used, a separate magnet may be required. In this case, a reference value for a position of the hall sensor may change, depending on a temperature or other external parameters. Therefore, in order to correct such a problem, additional circuits such as a low pass filter, an auto-gain control amplifier, a differential to single amplifier, an analog to digital converter, may be used.

Further, when an external hall sensor is used in such an approach, a bias current (for example, of several milliamperes) may be consumed in driving the hall sensor, and a current may be additionally consumed by various amplifiers (AMPs), and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus controlling a position of a camera module includes an operating coil disposed on a housing of the camera module to face a magnetic member disposed on a lens barrel of the camera module, a driving circuit configured to provide a driving current to the operating coil, a capacitor circuit configured to have a capacitor value to form a resonance circuit together with the operating coil to resonate at a resonance frequency varied depending on an inductance value of the operating coil, a resonance maintaining circuit configured to maintain a level of a resonance signal generated by the operating coil and the capacitor circuit, a resonance frequency detecting circuit configured to detect a resonance frequency signal from the resonance signal generated by the operating coil and the capacitor circuit, and a control circuit configured to control the driving circuit based on the resonance frequency signal from the resonance frequency detecting circuit.

The capacitor circuit may be connected in parallel with the operating coil to form the resonance circuit together with the operating coil, the capacitor circuit may include a first capacitor and a second capacitor connected to each other in series; and the resonance circuit is configured to generate the resonance signal with a resonance frequency that is varied based on a change in the inductance value of the operating coil.

A first high-side switch and a first low-side switch may be connected to each other in series between a power supply voltage terminal and a ground, and a second high-side switch and a second low-side switch may be connected to each other in series between the power supply voltage terminal and the ground, and the operating coil may have a first end connected to a first connection node between the first high-side switch and the first low-side switch and a second end connected to a second connection node between the second high-side switch and the second low-side switch.

The resonance maintaining circuit may include a signal amplifier configured to amplify the resonance signal from at least one of a first terminal of the capacitor circuit and a second terminal of the capacitor circuit, and output the amplified resonance signal to a capacitor connection node formed between the first capacitor and the second capacitor.

The resonance maintaining circuit may include a signal amplifier configured to amplify the resonance signal from at least one of a first terminal of the capacitor circuit and a second terminal of the capacitor circuit and output the amplified resonance signal to a capacitor connection node formed between the first capacitor and the second capacitor, a first switching circuit connected between the first terminal of the capacitor circuit and an input terminal of the signal amplifier and configured to interlock with the first low-side switch, and a second switching circuit connected between the second terminal of the capacitor circuit and the input terminal of the signal amplifier and configured to interlock with the second low-side switch.

The resonance maintaining circuit may include a signal amplifier configured to amplify the resonance signal from at least one of a first terminal of the capacitor circuit and a second terminal of the capacitor circuit and output the amplified resonance signal to a capacitor connection node formed between the first capacitor and the second capacitor, a first switching circuit connected between the first terminal of the capacitor circuit and an input terminal of the signal amplifier and configured to interlock with the first low-side switch, a first impedance circuit connected between the first connection node and the first low-side switch, and a second impedance circuit connected between the second connection node and the second low-side switch.

The resonance frequency detecting circuit may include a frequency counter configured to count a resonance frequency in response to the resonance signal generated by the operating coil and the capacitor circuit, and provide a resonance frequency count value as the resonance frequency signal.

In a general aspect, an apparatus controlling a position of a camera module, includes an operating coil disposed on a housing of the camera module to face a magnetic member disposed on a lens barrel of the camera module, a driving circuit comprising a first high-side switch and a first low-side switch connected to each other in series between a power supply voltage terminal and a ground, and a second high-side switch and a second low-side switch connected to each other in series between the power supply voltage terminal and the ground and configured to provide a driving current to the operating coil by connecting a first connection node between the first high-side switch and the first low-side switch to a first end of the operating coil and connecting a second connection node between the second high-side switch and the second low-side switch to a second end of the operating coil, a capacitor circuit configured to have a capacitor value to form a resonance circuit together with the operating coil to resonate at a resonance frequency that is varied based on an inductance value of the operating coil, a resonance maintaining circuit configured to maintain a level of a resonance signal generated by the operating coil and the capacitor circuit, a resonance frequency detecting circuit configured to detect a resonance frequency signal from the resonance signal generated by the operating coil and the capacitor circuit; and a control circuit configured to control the driving circuit in response to the resonance frequency signal from the resonance frequency detecting circuit The capacitor circuit may be connected in parallel with the operating coil to form the resonance circuit together with the operating coil, the capacitor circuit may include a first capacitor and a second capacitor connected to each other in series, and the resonance circuit is configured to generate the resonance signal with a resonance frequency varied based on a change in the inductance value of the operating coil.

The resonance maintaining circuit may include a signal amplifier configured to amplify the resonance signal from at least one of a first terminal of the capacitor circuit and a second terminal of the capacitor circuit and may output the amplified resonance signal to a capacitor connection node formed between the first capacitor and the second capacitor.

The resonance maintaining circuit may include a signal amplifier configured to amplify the resonance signal from at least one of a first terminal of the capacitor circuit and a second terminal of the capacitor circuit and may output the amplified resonance signal to a capacitor connection node formed between the first capacitor and the second capacitor, a first switching circuit connected between the first terminal of the capacitor circuit and an input terminal of the signal amplifier and configured to interlock with the first low-side switch, and a second switching circuit connected between the second terminal of the capacitor circuit and the input terminal of the signal amplifier and configured to interlock with the second low-side switch.

The resonance maintaining circuit may include a signal amplifier configured to amplify the resonance signal from at least one of a first terminal of the capacitor circuit and a second terminal of the capacitor circuit and may output the amplified resonance signal to a capacitor connection node formed between the first capacitor and the second capacitor, a first switching circuit connected between the first terminal of the capacitor circuit and an input terminal of the signal amplifier and configured to interlock with the first low-side switch, a second switching circuit connected between the second terminal of the capacitor circuit and the input terminal of the signal amplifier and configured to interlock with the second low-side switch, a first impedance circuit connected between the first connection node and the first low-side switch, and a second impedance circuit connected between the second connection node and the second low-side switch.

The resonance frequency detecting circuit may include a frequency counter configured to count a resonance frequency in response to the resonance signal generated by the operating coil and the capacitor circuit and provide a resonance frequency count value as the resonance frequency signal.

In a general aspect, a camera positioning method includes providing a coil current to an operating coil in response to a control signal, generating a resonance signal from a resonance circuit that includes the coil and a capacitor circuit, detecting a resonance frequency from the resonance signal, and controlling the position of the camera module based on the detected resonance frequency and a reference signal.

The coil current may include a driving current and a resonance current.

The reference signal may be a target position signal that corresponds to a target position of a lens of the camera module.

The resonance frequency may be varied based on a change in a capacitance value of the operating coil.

The resonance signal may be amplified and output to the capacitor circuit to maintain the amplified resonance signal at a predetermined level.

The resonance signal may be output from one of a first terminal or a second terminal of the capacitor circuit.

The amplified resonance signal may be transmitted to a connection node between a first capacitor of the capacitor circuit, and a second capacitor of the capacitor circuit.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
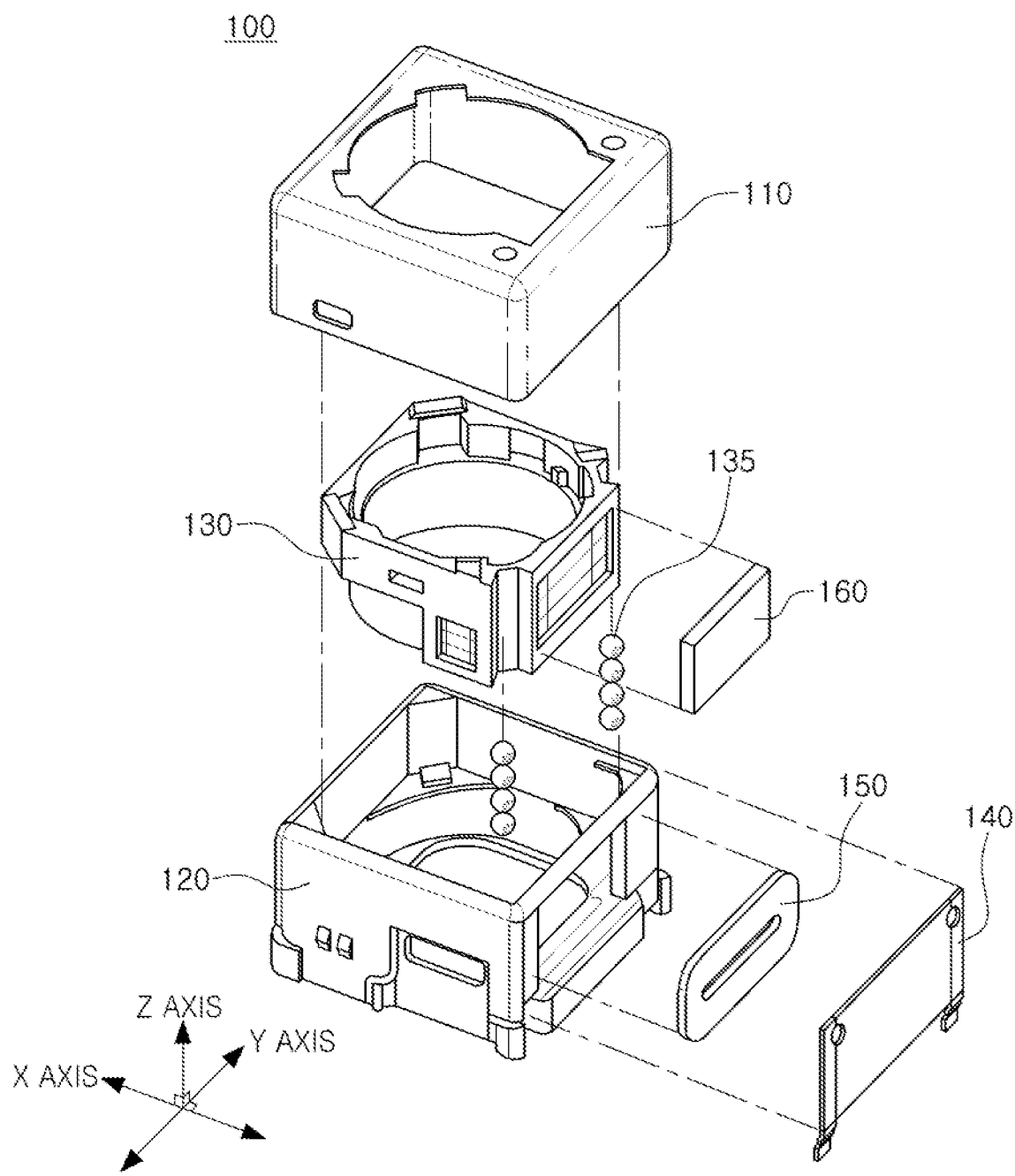
FIG. 1 is an exploded perspective view illustrating an example of a camera module.

Hereinafter, examples will be described in more detail with reference to the accompanying drawings. In the drawings, shapes, sizes, and the like, of components may be exaggerated for clarity.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be construed as being limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both upward and downward orientations, depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is an exploded perspective view illustrating an example of a camera module.

In the example of FIG. 1, the camera module 100 may include a case 110, a housing 120, a lens barrel 130, a substrate 140, an operating coil 150, and a magnetic member 160.

The camera module may include a position controlling circuit (e.g., FIG. 2) that performs driving operations, detection operations, and control operations.

The camera module 100 may further include ball bearings 135. A ball bearing type camera module using the ball bearings is illustrated in FIG. 1. However, the examples are not limited thereto, and examples also include, for example, a spring type camera module.

The lens barrel 130 may have a hollow cylindrical shape so that at least one lens may be accommodated therein to capture an image of a subject, and the lens may be disposed in an optical axis direction in the lens barrel 130. Here, the optical axis direction refers to a Z-axis direction in relation to the lens barrel 130 illustrated in FIG. 1. The lens barrel 130 may be disposed in the housing 120 and may be coupled to the housing 120 to move in the optical axis direction during autofocusing operations, and move in a second direction (for example, an X-axis direction or a Y-axis direction of FIG. 1) perpendicular to the optical axis direction during optical image stabilization (OIS) operations.

The housing 120 may have an internal space, and may accommodate the lens barrel 130 in the internal space thereof so that the lens barrel 130 may move in the optical axis direction or the one or more directions perpendicular to the optical axis direction.

At least one ball bearing 135 may be provided in the optical axis direction within the lens barrel 130, as a guide member guiding movement of the lens barrel 130 when the lens barrel 130 moves in the optical axis direction within the housing 120.

At least one ball bearing 135 may be disposed between the lens barrel 130 and the housing 120 so that one surface of the lens barrel 130 and one surface of the housing 120 are in contact with each other via the ball bearing 135, and may guide the movement of the lens barrel 130 in the optical axis direction while supporting the lens barrel 130 through a rolling motion.

The case 110 may be coupled to the housing 120 to form an exterior of the camera module. The case 110 may be coupled to the housing 120 to surround portions of outer surfaces of the housing 120. The case 110 may be formed of a metal to thus be grounded to a ground pad of the substrate mounted on one side surface of the housing 120. The example metal housing may block electromagnetic waves generated during driving of the camera module. However, this is only an example, and the case 110 may be formed of a non-metal material, as a non-limited example.

The magnetic member 160 may be disposed on one side surface of the lens barrel 130, and the operating coil 150 may be disposed on one surface of the substrate 140 mounted on one side surface of the housing 120 to face the magnetic member 160. As an example, the magnetic member 160 may be a magnet including a magnetic material having magnetic properties or may be a dielectric or a conductor.

The operating coil 150 may be disposed to be spaced apart from the magnetic member 160 by a predetermined interval, and when a driving current flows to the operating coil 150, a driving force may be transferred to the magnetic member 160 by an electromagnetic force generated by the operating coil 150 to move the magnetic member 160. A position of the lens of the lens barrel 130 to which the magnetic member 160 is attached may thus be controlled.

In an example, in view of mechanical design limitations of the camera module, such as additional current consumption and the rise in material costs, position detection and position controlling may be performed without the use of a hall sensor.

In the respective drawings in the examples, unnecessarily overlapped descriptions of components denoted by the same reference numerals and having the same functions will be omitted, and contents different from each other in the respective drawings will be described.

It is noted that use of the term "may" with respect to an example or embodiment, e.g., as to what an example or embodiment may include or implement, means that at least one example or embodiment exists where such a feature is included or implemented while all examples and embodiments are not limited thereto.

Figure 2:
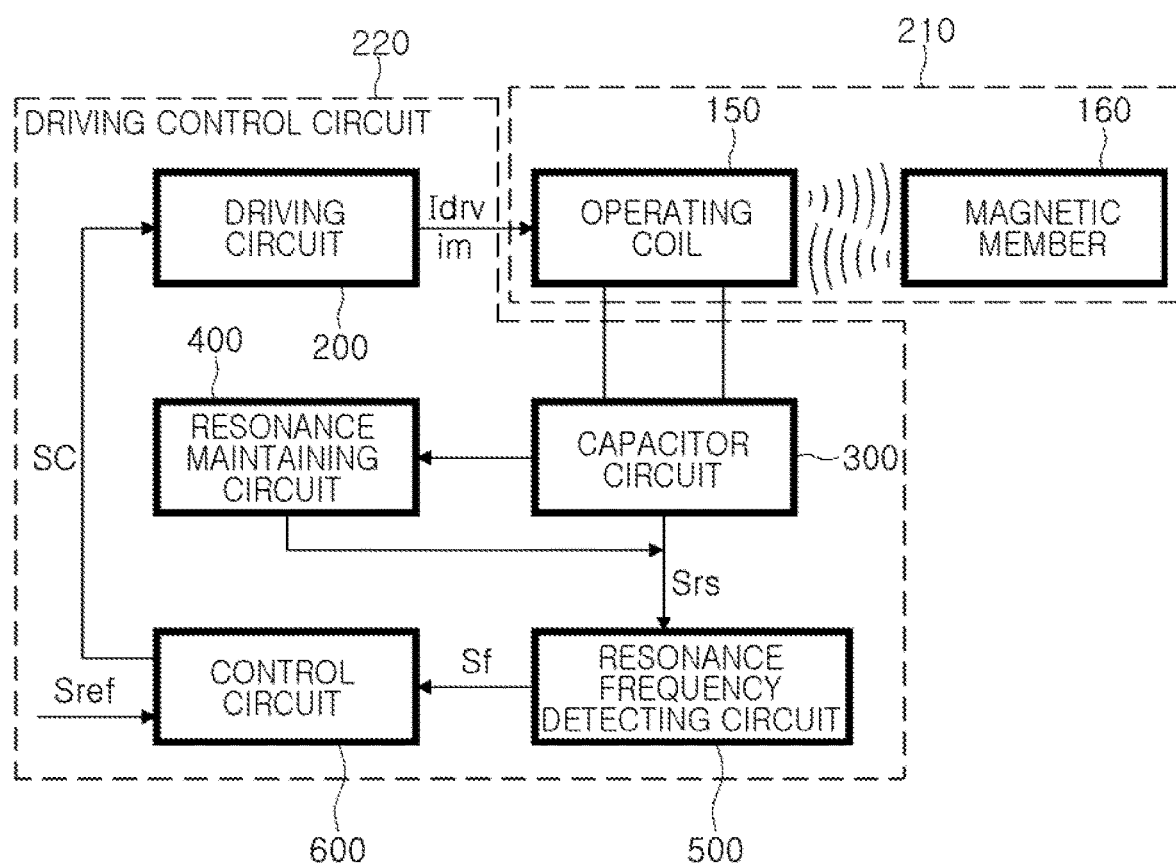
FIG. 2 is a block diagram illustrating an example of an apparatus controlling a position of a camera module.

FIG. 2 is a block diagram illustrating an example of an apparatus controlling a position of a camera module.

In the examples of FIG. 1, the apparatus controlling a position of a camera module may include an actuator 210, and a driving control circuit 220, such as discussed below with respect to FIG. 2.

The actuator 210, which controls a position of the lens based on a driving force, may include the operating coil 150 and the magnetic member 160 illustrated in FIG. 1. The driving control circuit 220 may include a driving circuit 200, a capacitor circuit 300, a resonance maintaining circuit 400, a resonance frequency detecting circuit 500, and a control circuit 600. As an example, the driving control circuit may be implemented by at least one integrated circuit.

The operating coil 150 may be disposed on one side surface of the housing 120 of the camera module 100 to face the magnetic member 160 disposed on one side surface of the lens barrel 130 of the camera module 100.

The driving circuit 200 may provide a coil current Icoil (FIG. 6) to the operating coil 150 on the basis of a control signal SC of the control circuit 600, and the coil current Icoil may include a driving current Idrv and a resonance current Irs.

The capacitor circuit 300 may include a capacitor value to form a resonance circuit together with the operating coil 150 to resonate at a resonance frequency that is varied depending on an inductance value of the operating coil 150. As an example, a level of a resonance signal Srs generated by the operating coil 150 and the capacitor circuit 300 is reduced during driving of the camera module, and thus needs to be maintained to be appropriate for detecting the resonance signal Srs in order to accurately detect the resonance signal Srs.

The resonance maintaining circuit 400 may maintain the level of the resonance signal generated by the operating coil 150 and the capacitor circuit 300. As an example, the resonance maintaining circuit 400 may amplify the resonance signal and provide the amplified resonance signal to the capacitor circuit 300.

The resonance frequency detecting circuit 500 may detect a resonance frequency signal Sf from the resonance signal Srs generated by the operating coil 150 and the capacitor circuit 300.

The control circuit 600 may control the driving circuit 200 on the basis of the resonance frequency signal Sf from the resonance frequency detecting circuit 500 and a reference signal Sref. The reference signal Sref may be a target position signal corresponding to a target position of the lens.

Figure 3:
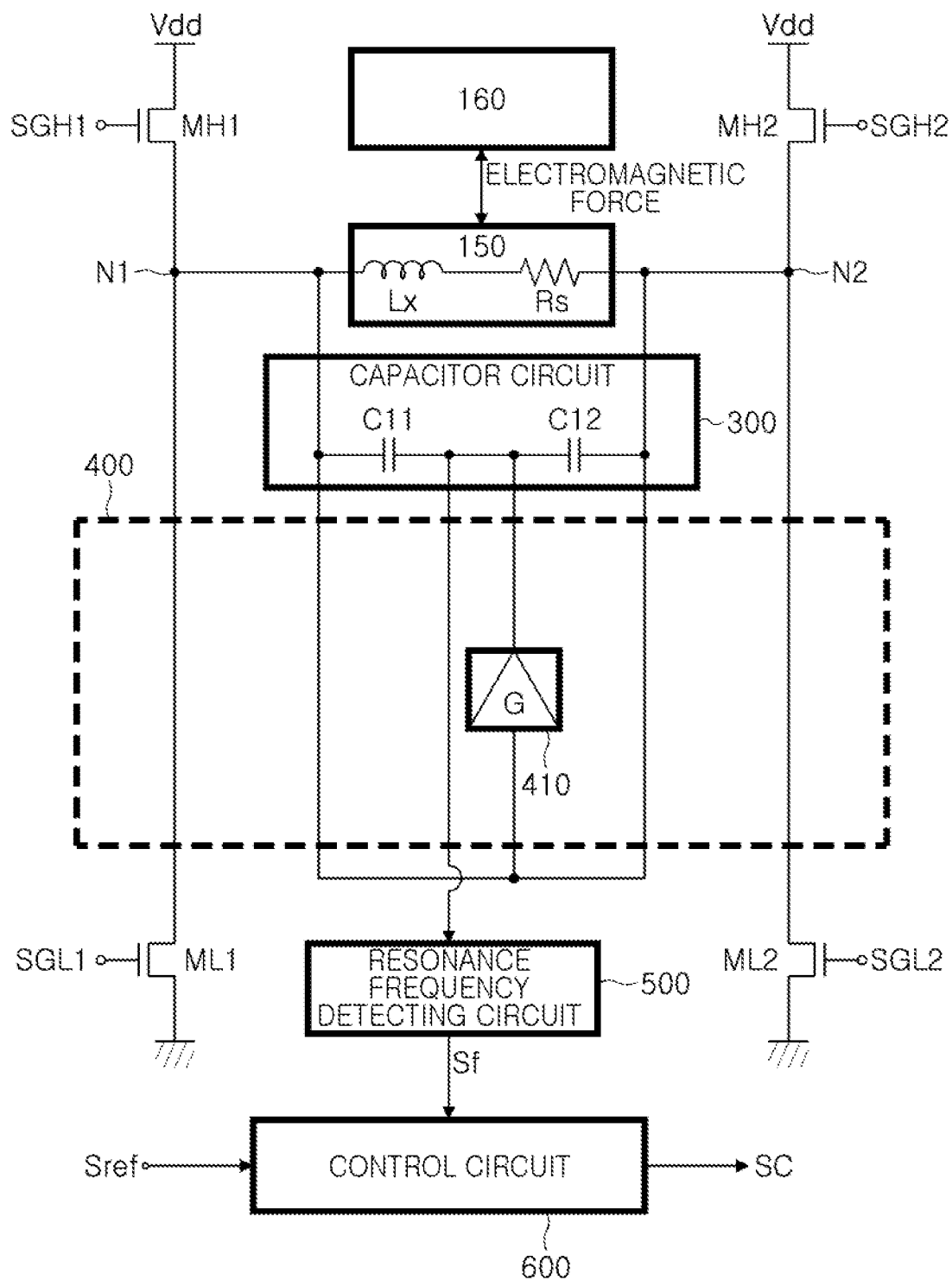
FIG. 3 is a circuit diagram illustrating an example of an apparatus controlling a position of a camera module.
Figure 4:
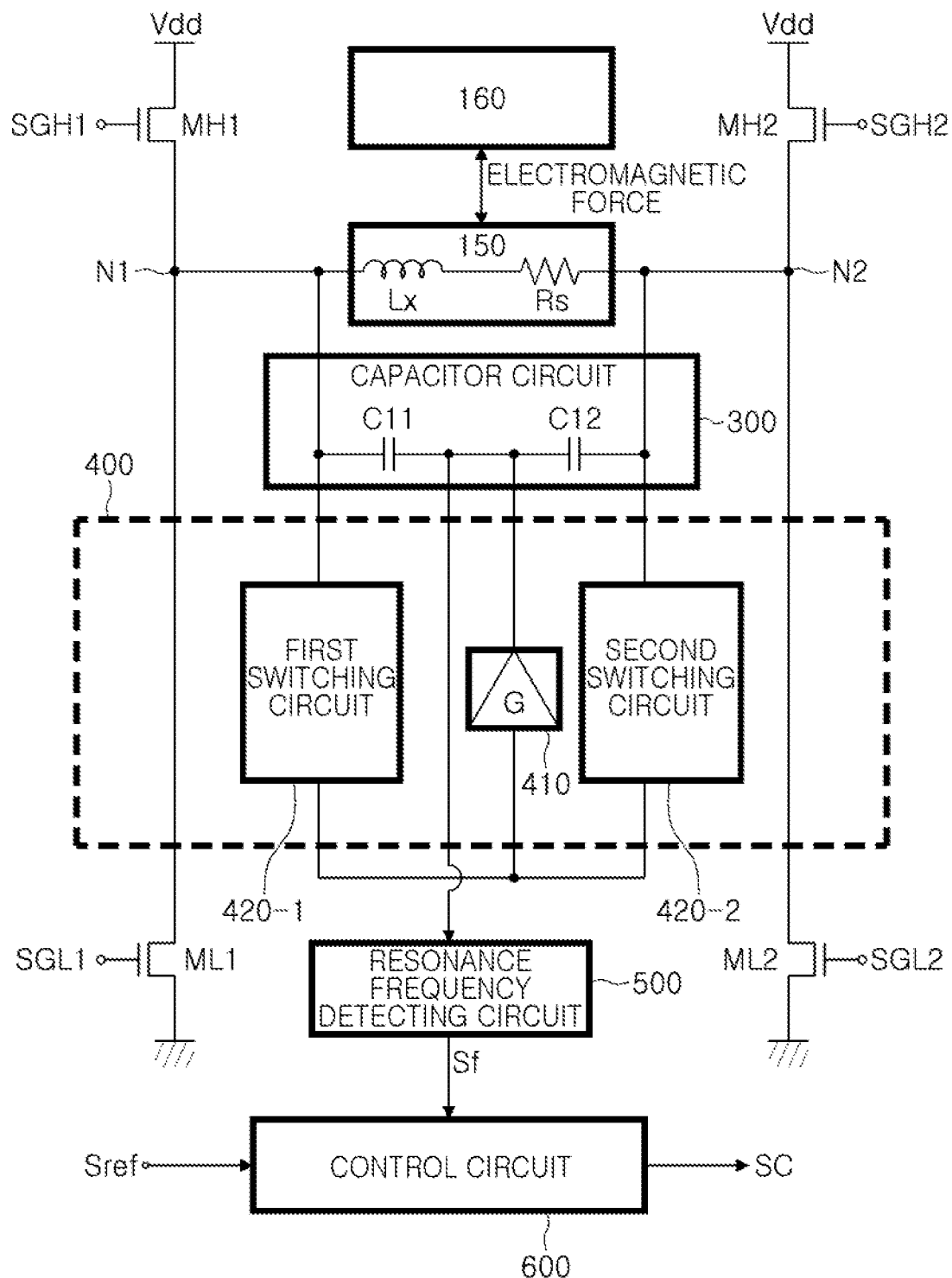
FIG. 4 is circuit diagram illustrating an example of an apparatus controlling a position of a camera module.
Figure 5:
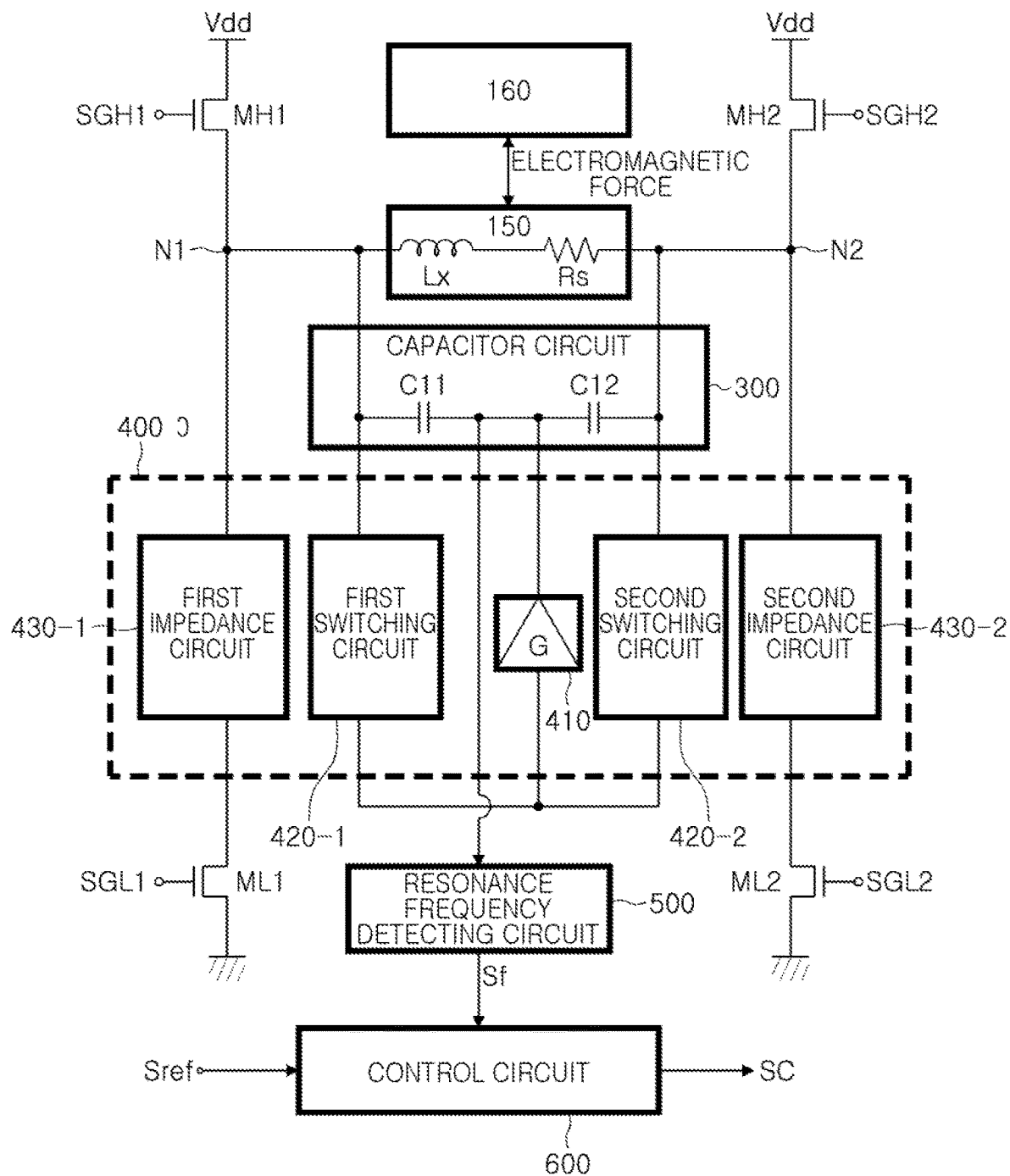
FIG. 5 is a circuit diagram an example of an apparatus controlling a position of a camera module.

FIG. 3 is a circuit diagram illustrating an example of an apparatus controlling a position of a camera module FIG. 4 is a circuit diagram illustrating another example of an apparatus controlling a position of a camera module, and FIG. 5 is another circuit diagram illustrating an example of an apparatus controlling a position of a camera module.

In the examples of FIGS. 3 through 5, as a non-limiting example, the operating coil 150 of FIG. 1 may be equivalently modeled as an inductance component Lx and a resistance component Rs.

As a non-limiting example, the capacitor circuit 300 may be connected to the operating coil 150 in parallel to form a resonance circuit together with the operating coil 150, and may include a first capacitor C11 and a second capacitor C12 connected to each other in series. The resonance circuit formed by the operating coil 150 and the capacitor circuit 300 may generate the resonance signal Srs having a resonance frequency that is varied based on a change in a capacitor value of the operating coil 150.

As an example, when a position of the magnetic member 160 is changed by a driving force of the operating coil 150, an overlap area between the magnetic member 160 and the operating coil 150 may be changed in a state in which a gap of a predetermined distance or more is maintained between the magnetic member 160 and the operating coil 150, and a change in an inductance value of the operating coil 150 may be generated depending on the change in the overlap area.

As another example, when a position of the magnetic member 160 is changed by a driving force of the operating coil 150, a gap between the magnetic member 160 and the operating coil 150 may be changed, and a change in an inductance value of the operating coil 150 may be generated depending on the change in the gap.

As an example, the driving circuit 200 may include a first high-side switch MH1, a first low-side switch ML1, a second high-side switch MH2, and a second low-side switch ML2. The first high-side switch MH1 and the first low-side switch ML1 may be connected to each other in series between a power supply voltage Vdd terminal and a ground, the second high-side switch MH2 and the second low-side switch ML2 may be connected to each other in series between the power supply voltage Vdd terminal and the ground, and the operating coil 150 may have one end N1 connected to a first connection node between the first high-side switch MH1 and the first low-side switch ML1 and the other end N2 connected to a second connection node between the second high-side switch MH2 and the second low-side switch ML2.

For example, when a driving current flows to the operating coil 150 through the first high-side switch MH1 and the second low-side switch ML2 controlled by a first gate signal SGH1 and a fourth gate signal SGL2, one of the first high-side switch MH1 and the second low-side switch ML2 may be maintained in a switch-on state, and the other of the first high-side switch MH1 and the second low-side switch ML2 may be controlled in order to control the driving current flowing to the operating coil 150.

Similarly, for example, when a driving current flows to the operating coil 150 through the second high-side switch MH2 and the first low-side switch ML1 controlled by a second gate signal SGH2 and a third gate signal SGL1, one of the second high-side switch MH2 and the first low-side switch ML1 may be maintained in a switch-on state, and the other of the second high-side switch MH2 and the first low-side switch ML1 may be controlled in order to control the driving current flowing to the operating coil 150.

As an example, the first gate signal SGH1, the second gate signal SGH2, the third gate signal SGL1, and the fourth gate signal SGL2 may be provided by the control circuit 600 or be provided by another circuit.

Figure 6:
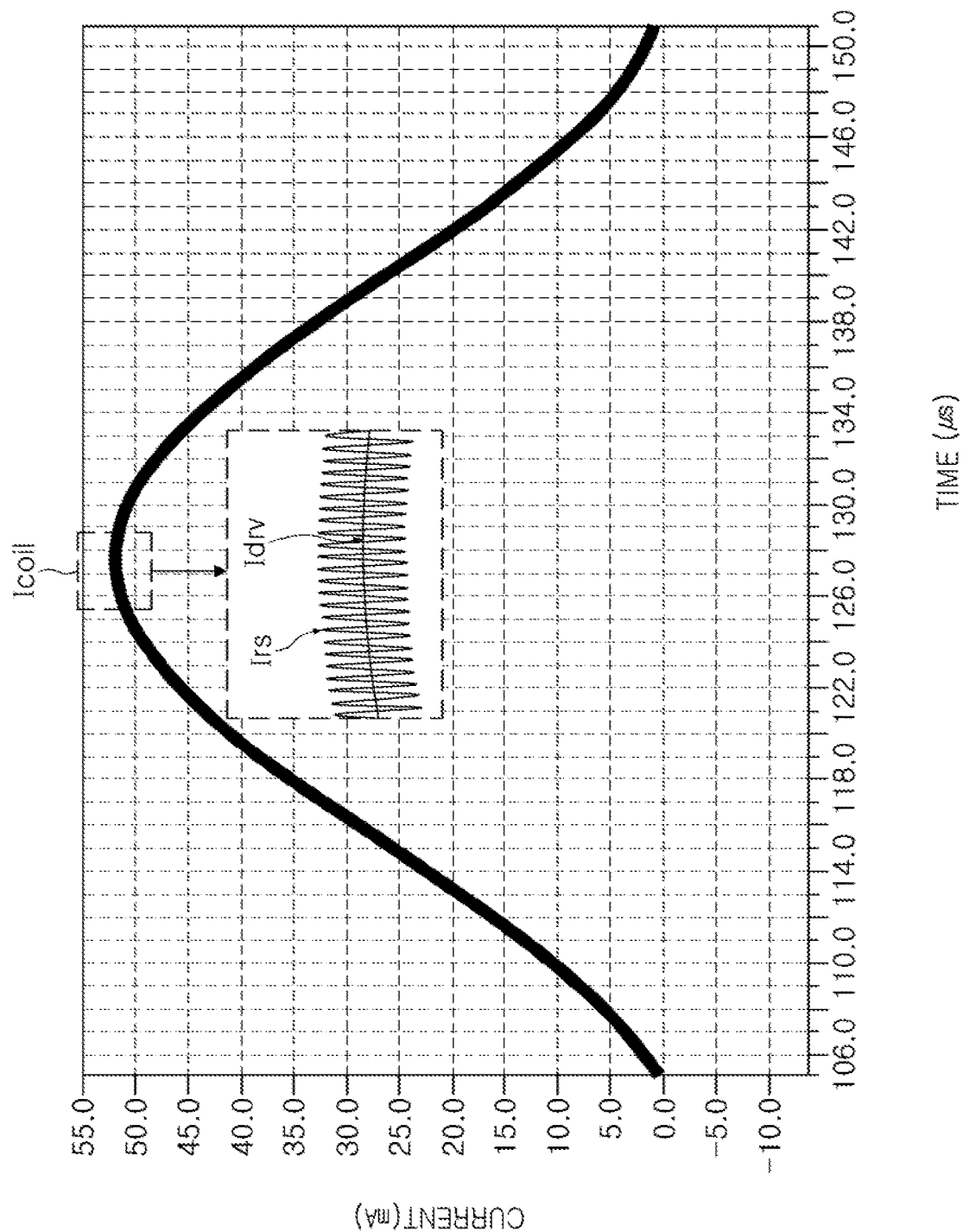
FIG. 6 illustrates an example of a waveform of a coil current of an operating coil.

FIG. 6 illustrates an example of a waveform of a coil current of an operating coil. In FIG. 6, Idrv may be a driving current, and Irs may be a resonance current. In the example of FIG. 6, the driving current Idrv may be a direct current (DC) current changed in order to change a position of the lens, and the resonance current Irs may be an alternating current (AC) current carried on the driving current Idrv.

The coil current Icoil flowing to the operating coil 150 may include the driving current Idrv and the resonance current Irs.

In the examples of FIGS. 3 and 6, the resonance maintaining circuit 400 may include a signal amplifier 410. The signal amplifier 410 may amplify the resonance signal Srs from at least one of a first terminal N1 and a second terminal N2 of the capacitor circuit 300 and output the amplified resonance signal to a capacitor connection node between the first capacitor C11 and the second capacitor C12, in order to maintain the level of the resonance signal.

The signal amplifier 410 may amplify the resonance signal by a level decreased from the resonance signal to contribute to maintaining the level of the resonance signal.

In the examples of FIGS. 4 and 6, the resonance maintaining circuit 400 may include a signal amplifier 410, a first switching circuit 420-1, and a second switching circuit 420-2.

The signal amplifier 410 may amplify the resonance signal Srs from at least one of a first terminal N1 and a second terminal N2 of the capacitor circuit 300 and output the amplified resonance signal to a capacitor connection node between the first capacitor C11 and the second capacitor C12.

As a non-limiting example, the first switching circuit 420-1 may be connected between the first terminal N1 of the capacitor circuit 300 and an input terminal of the signal amplifier 410, and may interlock with the first low-side switch ML1. As an example, in a case in which a current flows from the first high-side switch MH1 to the second low-side switch ML2 through the first terminal N1 and the second terminal N2, when the first high-side switch MH1 performs a switching operation and the second low-side switch ML2 is operated as a current source, the first terminal N1 may become a ground GND for AC and the second terminal N2 may become an oscillation terminal, such that the first switching circuit 420-1 enters a switch-off state and the second switching circuit 420-2 enters a switch-on state. In this case, the first low-side switch ML1 may be in a switch-off state.

As a non-limiting example, the second switching circuit 420-2 may be connected between the second terminal N2 of the capacitor circuit 300 and the input terminal of the signal amplifier 410, and may interlock with the second low-side switch ML2. As an example, in a case in which a current flows from the second high-side switch MH2 to the first low-side switch ML1 through the second terminal N2 and the first terminal N1, when the second high-side switch MH2 performs a switching operation and the first low-side switch ML1 is operated as a current source, the second terminal N2 may become a ground GND for AC and the first terminal N1 may become an oscillation terminal, such that the second switching circuit 420-2 enters a switch-off state and the first switching circuit 420-1 enters a switch-on state. In this case, the second low-side switch ML2 may be in a switch-off state.

The first switching circuit 420-1 and the second switching circuit 420-2 may form a path for maintaining and detecting the resonance signal. The first switching circuit 420-1 and the second switching circuit 420-2 may be switches for controlling a path through which the resonance signal may be leaked, and may contribute to maintaining the level of the resonance signal.

In the examples of FIGS. 5 and 6, the resonance maintaining circuit 400 may include a signal amplifier 410, a first switching circuit 420-1, a second switching circuit 420-2, a first impedance circuit 430-1, and a second impedance circuit 430-2.

The signal amplifier 410 may amplify the resonance signal Srs from at least one of a first terminal N1 and a second terminal N2 of the capacitor circuit 300 and output the amplified resonance signal to a capacitor connection node between the first capacitor C11 and the second capacitor C12.

In a non-limiting example, the first switching circuit 420-1 may be connected between the first terminal N1 of the capacitor circuit 300 and an input terminal of the signal amplifier 410, and may interlock with the first low-side switch ML1. As an example, in a case in which a current flows from the first high-side switch MH1 to the second low-side switch ML2 through the first terminal N1 and the second terminal N2, when the first high-side switch MH1 performs a switching operation and the second low-side switch ML2 is operated as a current source, the first terminal N1 may become a ground GND for AC, and the second terminal N2 may become an oscillation terminal, such that the first switching circuit 420-1 enters a switch-off state and the second switching circuit 420-2 enters a switch-on state. In this case, the first low-side switch ML1 may be in a switch-off state.

As a non-limiting example, the second switching circuit 420-2 may be connected between the second terminal N2 of the capacitor circuit 300 and the input terminal of the signal amplifier 410, and may interlock with the second low-side switch ML2. As an example, in a case in which a current flows from the second high-side switch MH2 to the first low-side switch ML1 through the second terminal N2 and the first terminal N1, when the second high-side switch MH2 performs a switching operation and the first low-side switch ML1 is operated as a current source, the second terminal N2 may become a ground GND for AC and the first terminal N1 may become an oscillation terminal, such that the second switching circuit 420-2 enters a switch-off state and the first switching circuit 420-1 enters a switch-on state. In this case, the second low-side switch ML2 may be in a switch-off state.

The first impedance circuit 430-1 may be connected between the first connection node N1 and the first low-side switch ML1. In addition, the second impedance circuit 430-2 may be connected between the second connection node N2 and the second low-side switch ML2.

As an example, the first impedance circuit 430-1 and the second impedance circuit 430-2 may include impedances that pass a driving current, a DC current, therethrough and block a resonance current, an AC current. The first impedance circuit 430-1 may include a switch interlocking with the first low-side switch ML1 and the second impedance circuit 430-2 may include a switch interlocking with the second low-side switch ML2.

The first impedance circuit 430-1 and the second impedance circuit 430-2 may prevent a resonance signal, an AC signal, from being leaked in a path through which the resonance signal may be leaked, thus maintaining a level of the resonance signal.

In the examples of FIGS. 3 through 6, when the driving current flows to the operating coil 150 through the first high-side switch MH1 and the second low-side switch ML2, the signal amplifier 410 may amplify the resonance signal input from the second terminal N2 of the capacitor circuit 300 and provide the amplified resonance signal to the capacitor connection node.

In the examples of FIGS. 4 and 5, when the driving current flows to the operating coil 150 through the first high-side switch MH1 and the second low-side switch ML2, the first switching circuit 420-1 may interlock with the first low-side switch ML1, in a switch-off state, to enter a switch-off state, and the second switching circuit 420-2 may interlock with the second low-side switch ML2, in a switch-on state, to enter a switch-on state. The signal amplifier 410 may amplify the resonance signal input from the second terminal N2 of the capacitor circuit 300 and provide the amplified resonance signal to the capacitor connection node.

In the examples of FIG. 5, when the driving current flows to the operating coil 150 through the first high-side switch MH1 and the second low-side switch ML2, the first switching circuit 420-1 may interlock with the first low-side switch ML1, in a switch-off state, to enter a switch-off state, and the second switching circuit 420-2 may interlock with the second low-side switch ML2, in a switch-on state, to enter a switch-on state. The signal amplifier 410 may amplify the resonance signal input from the second terminal N2 of the capacitor circuit 300 and provide the amplified resonance signal to the capacitor connection node.

In addition, the second impedance circuit 430-2 may serve to pass the driving current therethrough and block the resonance current, between the second terminal N2 of the operating coil 150 and the second low-side switch ML2.

Therefore, the signal amplifier 410, the second switching circuit 420-2, the second impedance circuit 430-2 may combine to maintain the level of the resonance signal.

In the examples of FIGS. 3 through 6, when the driving current flows to the operating coil 150 through the second high-side switch MH2 and the first low-side switch ML1, the signal amplifier 410 may amplify the resonance signal input from the first terminal N1 of the capacitor circuit 300 and provide the amplified resonance signal to the capacitor connection node.

In the examples of FIGS. 4 and 5, when the driving current flows to the operating coil 150 through the second high-side switch MH2 and the first low-side switch ML1, the first switching circuit 420-1 may interlock with the first low-side switch ML1, in a switch-on state, to enter the switch-on state, and the second switching circuit 420-2 may interlock with the second low-side switch ML2, in a switch-off state, to enter the switch-off state. The signal amplifier 410 may amplify the resonance signal input from the first terminal N1 of the capacitor circuit 300 and provide the amplified resonance signal to the capacitor connection node.

The first impedance circuit 430-1 may serve to pass the driving current therethrough and block the resonance current, between the first terminal N1 of the operating coil 150 and the first low-side switch ML1.

Therefore, the signal amplifier 410, the first switching circuit 420-1, the first impedance circuit 430-1 may contribute to maintaining the level of the resonance signal.

Figure 7:
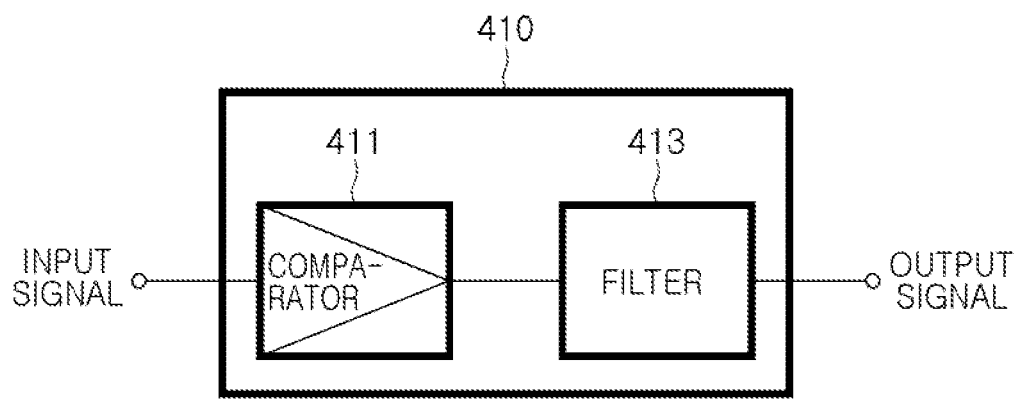
FIG. 7 illustrates an example of an operation of a signal amplifier.
Figure 8:
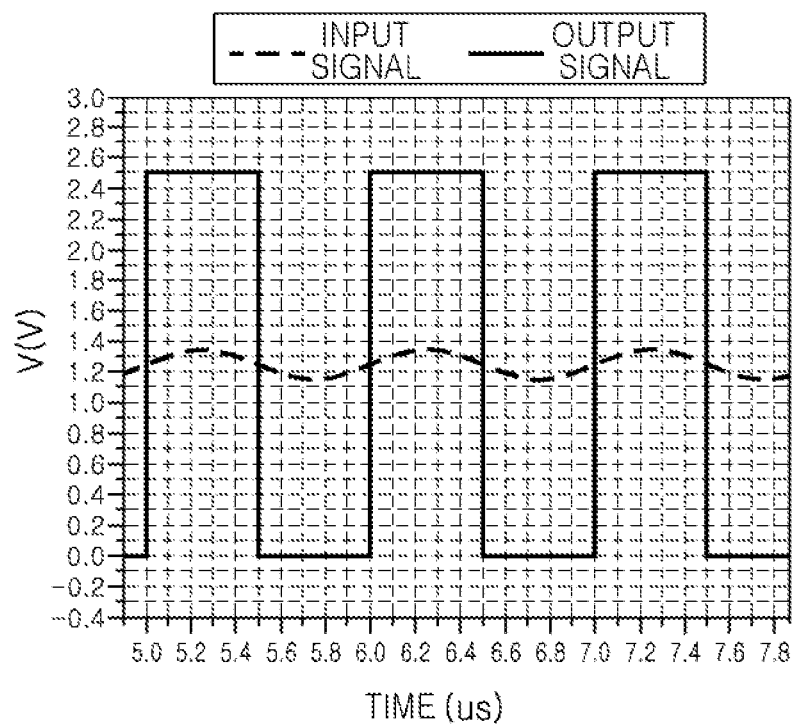
FIG. 8 illustrates examples of waveforms of an input signal and an output signal of a signal amplifier.

FIG. 7 illustrates an example of an operation of a signal amplifier, and FIG. 8 illustrates examples of waveforms of an input signal and an output signal of the signal amplifier of FIG. 7.

In the examples of FIGS. 7 and 8, the signal amplifier 410 may include a comparator 411 and a filter 413 as an example, but is not limited thereto.

The comparator 411 may compare a voltage level (for example 0.3V Vp-p) of the resonance signal Srs input thereto and a voltage level of the reference signal with each other, and may provide a pulse signal having a high-level voltage (2.5V) when the voltage level of the resonance signal Srs is higher than that of the reference signal and provide a pulse signal having a low-level voltage (0V) when the voltage level of the resonance signal Srs is lower than the voltage level of the reference signal. Therefore, the signal amplifier 410 may amplify the voltage level (0.3V Vp-p) of the resonance signal Srs to a voltage having a high level of 2.5V and a low level of 0V.

The filter 413 may filter the pulse signal input from the comparator 411, and provide a resonance signal having a sinusoidal wave form.

Figure 9:
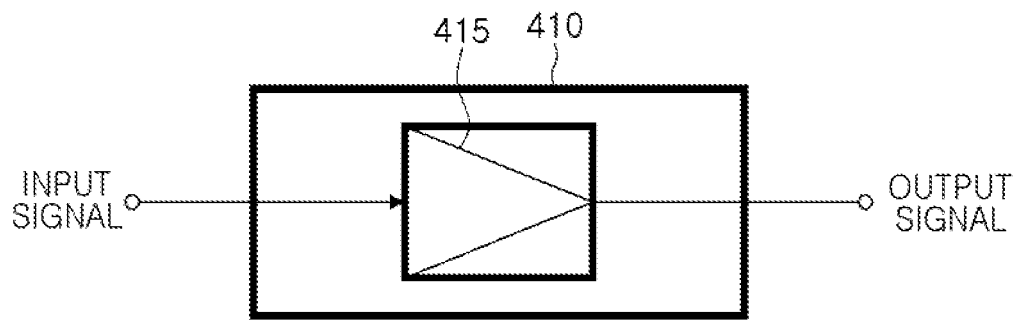
FIG. 9 illustrates an example of an operation of a signal amplifier.
Figure 10:
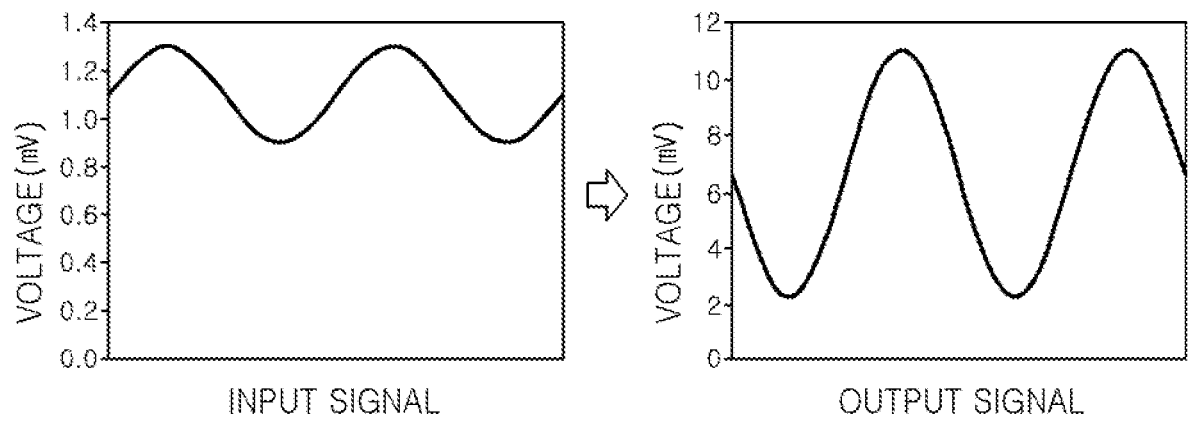
FIG. 10 illustrates examples of waveforms of an input signal and an output signal of a signal amplifier.

FIG. 9 illustrates an example of an operation of a signal amplifier, and FIG. 10 illustrates waveforms of an input signal and an output signal of the signal amplifier of FIG. 9.

In the examples of FIGS. 9 and 10, the signal amplifier 410 may include an analog amplifying circuit 415. The analog amplifying circuit 415 may amplify a voltage level (0.3 Vmp-p) of the resonance signal Srs into a signal having a voltage level of 9 Vmp-p.

Figure 11:
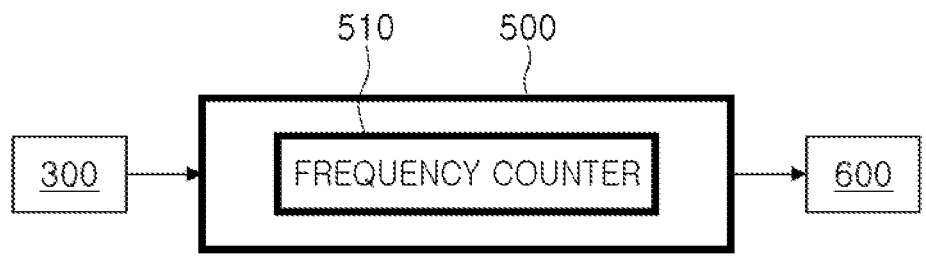
FIG. 11 is a block diagram illustrating an example of a resonance frequency detecting circuit.

FIG. 11 is a block diagram illustrating a resonance frequency detecting circuit.

In the example of FIG. 11, the resonance frequency detecting circuit 500 may include a frequency counter 510. The frequency counter 510 may count a resonance frequency Frs on the basis of the resonance signal Srs generated by the operating coil 150 and the capacitor circuit 300, and provide a resonance frequency count value as the resonance frequency signal Sf.

Figure 12:
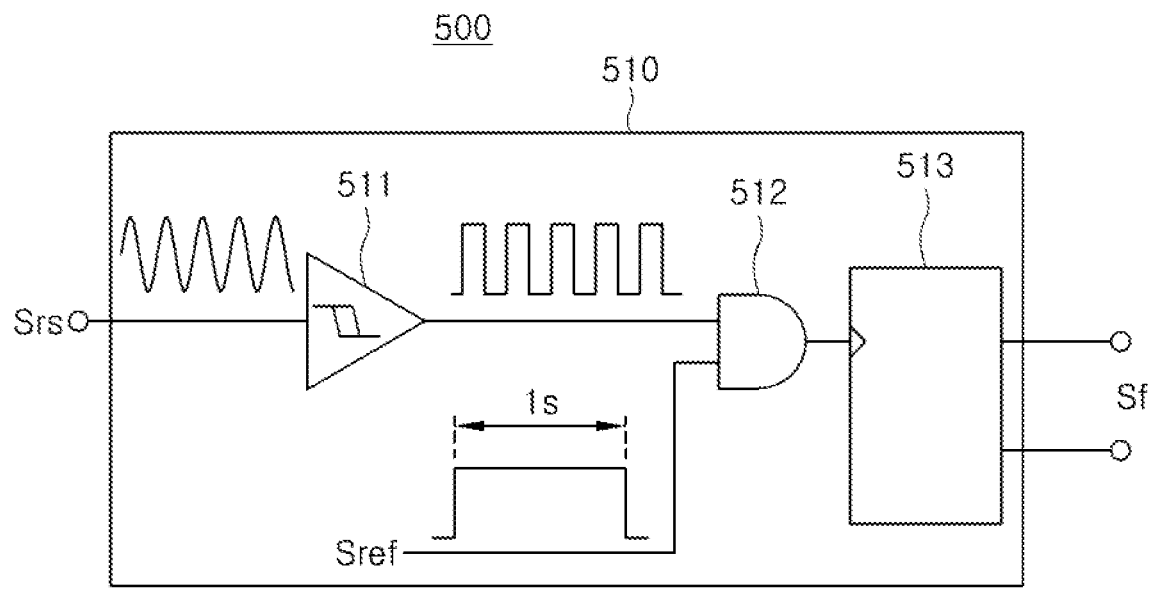
FIG. 12 is a circuit diagram illustrating an example of a resonance frequency detecting circuit.

FIG. 12 is a circuit diagram illustrating an example of a resonance frequency detecting circuit.

In the example of FIG. 12, the resonance frequency detecting circuit 500 may include a comparator 511 such as a Schmitt-trigger, an AND gate 512, and a latch 513.

The comparator 511 may convert the resonance signal Srs generated by the operating coil 150 and the capacitor circuit 300 into a pulse signal and provide the pulse signal to the AND gate 512. The AND gate 512 may perform logical conjunction on the pulse signal input from the comparator 511 and a preset reference period signal Sref (for example, 1 sec) and provide a logical conjunction signal to the latch 513. The latch 513 may count the logical conjunction signal input from the AND gate 512 and provide a frequency count value.

Figure 13:
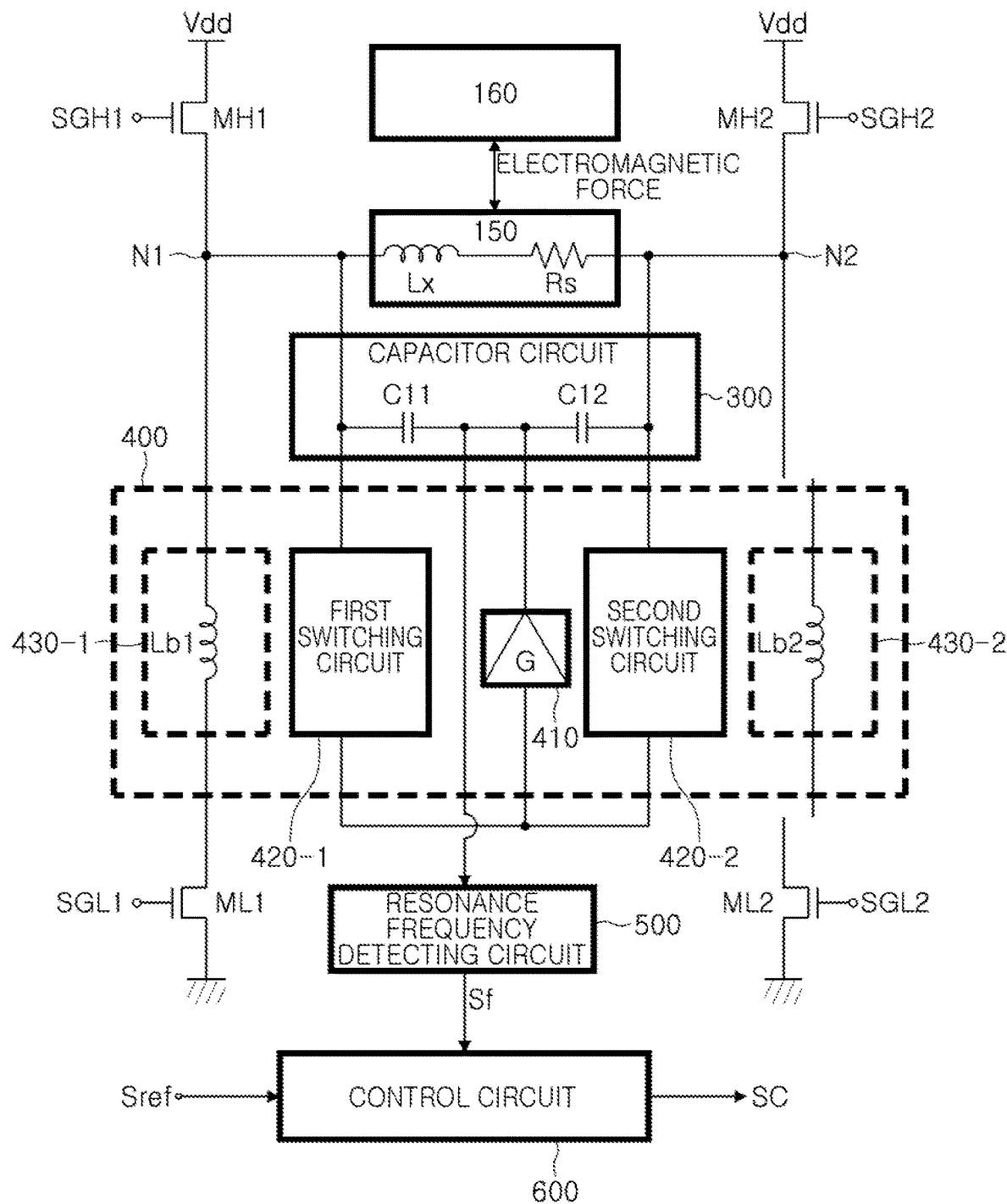
FIG. 13 is a circuit diagram illustrating an example of first and second impedance circuits.

FIG. 13 is a circuit diagram illustrating examples of first and second impedance circuits.

In the example of FIG. 13, the first and second impedance circuits 430-1 and 430-2 may include first and second inductors Lb1 and Lb2, respectively.

As an example, each of the first and second inductors Lb1 and Lb2 may include an impedance that passes a driving current, a DC current, therethrough and blocks a resonance current, an AC current.

Figure 14:
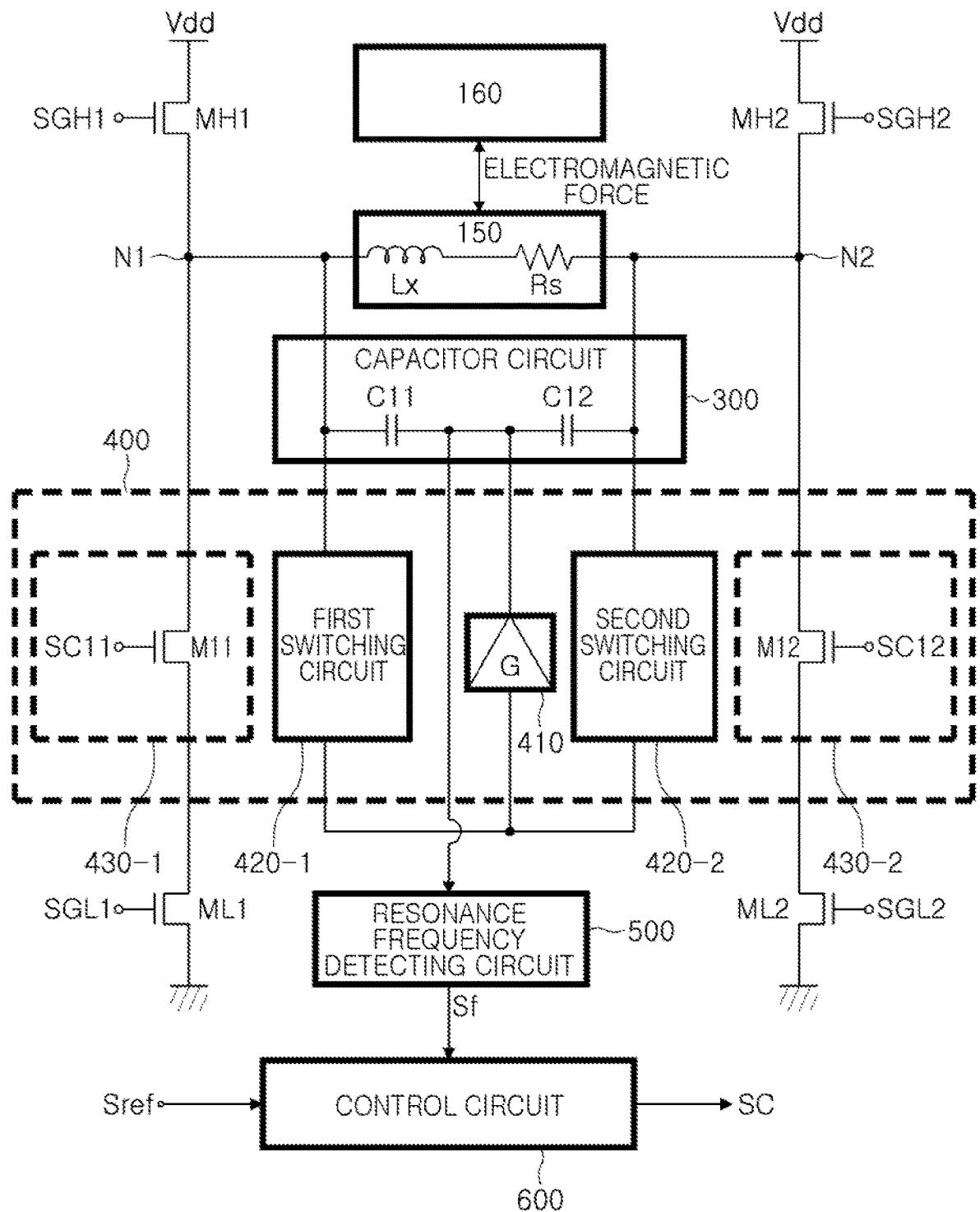
FIG. 14 is a circuit diagram illustrating an example of first and second impedance circuits.

FIG. 14 is another circuit diagram illustrating an example of first and second impedance circuits.

In the example of FIG. 14, the first and second impedance circuits 430-1 and 430-2 may include first and second switch elements M11 and M12, respectively.

As an example, the first switch element M11 may interlock with the first low-side switch ML1 in response to a first control signal SC11, and the second switch element M12 may interlock with the second low-side switch ML2 in response to a second control signal SC12.

The control circuit 600 of the apparatus controlling a position of a camera module according to the examples, may be representative of, or implemented by, a computing environment in which a processor (for example, a central processing unit (CPU), a graphics processing unit (GPU), a microprocessor, an application specific integrated circuit (ASIC), a field programmable gate array (FPGA), or the like), a memory (for example, a volatile memory (such as a random access memory (RAM)), a non-volatile memory (such as a read-only memory (ROM), a flash memory, or the like), a magnetic storage, an optical storage, or the like), an input device (for example, a keyboard, a mouse, a pen, a voice input device, a touch input device, an infrared camera, a video input device, or the like), an output device (for example, a display, a speaker, a printer, or the like), and a communications access (for example, a modem, a network interface card (NIC), an integrated network interface, a radio frequency transmitter/receiver, an infrared port, a universal serial bus (USB) access, or the like) are interconnected to one another (for example, a peripheral component interconnect (PCI), a USB, a firmware (IEEE 1394), an optical bus structure, a network, or the like). The computing environment may be representative of, or implemented by, a personal computer, a server computer, a handheld or laptop device, a mobile device (a mobile phone, a personal digital assistant (PDA), a media player, or the like), a multiprocessor system, a consumer electronic device, a mini computer, a mainframe computer, a distributed computing environment including any system or device described above, and the like, but is not limited thereto.

As set forth above, both of driving and sensing of the lens barrel may be performed and the resonance frequency changed depending on a change in a position of the lens may be maintained and detected, by a single operating coil without using a separate sensing member such as a hall sensor, an inductive sensor, or the like. Therefore, a design, a manufacturing process, and a spatial disposition related to the separate sensing member are not required, such that there may be advantages in terms of reduction of a size of the camera module, reduction of a cost required for manufacturing camera module, and simplification of a production procedure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus controlling a position of a camera module, the apparatus comprising:
an operating coil disposed on a housing of the camera module to face a magnetic member disposed on a lens barrel of the camera module;
a driving circuit configured to provide a driving current to the operating coil;
a capacitor circuit, connected in parallel with the operating coil, and configured to have a capacitor value to form a resonance circuit together with the operating coil to resonate at a resonance frequency varied depending on an inductance value of the operating coil;
a resonance maintaining circuit configured to maintain a level of a resonance signal generated by the operating coil and the capacitor circuit;
a resonance frequency detecting circuit configured to detect a resonance frequency signal from the resonance signal generated by the operating coil and the capacitor circuit; and
a control circuit configured to control the driving circuit based on the resonance frequency signal from the resonance frequency detecting circuit,
wherein the capacitor circuit comprises a first capacitor and a second capacitor connected to each other in series.

2. The apparatus of claim 1, wherein the resonance circuit is configured to generate the resonance signal with a resonance frequency that is varied based on a change in the inductance value of the operating coil.

3. The apparatus of claim 2, wherein the driving circuit comprises:
a first high-side switch and a first low-side switch connected to each other in series between a power supply voltage terminal and a ground; and
a second high-side switch and a second low-side switch connected to each other in series between the power supply voltage terminal and the ground, and
the operating coil has a first end connected to a first connection node between the first high-side switch and the first low-side switch and a second end connected to a second connection node between the second high-side switch and the second low-side switch.

4. The apparatus of claim 3, wherein the resonance maintaining circuit comprises a signal amplifier configured to amplify the resonance signal from at least one of a first terminal of the capacitor circuit and a second terminal of the capacitor circuit, and output the amplified resonance signal to a capacitor connection node formed between the first capacitor and the second capacitor.

5. The apparatus of claim 3, wherein the resonance maintaining circuit comprises:
a signal amplifier configured to amplify the resonance signal from at least one of a first terminal of the capacitor circuit and a second terminal of the capacitor circuit and output the amplified resonance signal to a capacitor connection node formed between the first capacitor and the second capacitor;

a first switching circuit connected between the first terminal of the capacitor circuit and an input terminal of the signal amplifier and configured to interlock with the first low-side switch; and a second switching circuit connected between the second terminal of the capacitor circuit and the input terminal of the signal amplifier and configured to interlock with the second low-side switch.

6. The apparatus of claim 3, wherein the resonance maintaining circuit comprises:

a signal amplifier configured to amplify the resonance signal from at least one of a first terminal of the capacitor circuit and a second terminal of the capacitor circuit and output the amplified resonance signal to a capacitor connection node formed between the first capacitor and the second capacitor;

a first switching circuit connected between the first terminal of the capacitor circuit and an input terminal of the signal amplifier and configured to interlock with the first low-side switch;

a second switching circuit connected between the second terminal of the capacitor circuit and the input terminal of the signal amplifier and configured to interlock with the second low-side switch;

a first impedance circuit connected between the first connection node and the first low-side switch; and a second impedance circuit connected between the second connection node and the second low-side switch.

7. The apparatus of claim 3, wherein the resonance frequency detecting circuit comprises a frequency counter configured to count a resonance frequency in response to the resonance signal generated by the operating coil and the capacitor circuit, and provide a resonance frequency count value as the resonance frequency signal.

8. An apparatus controlling a position of a camera module, the apparatus comprising:

an operating coil disposed on a housing of the camera module to face a magnetic member disposed on a lens barrel of the camera module;

a driving circuit comprising a first high-side switch and a first low-side switch connected to each other in series between a power supply voltage terminal and a ground, and a second high-side switch and a second low-side switch connected to each other in series between the power supply voltage terminal and the ground and configured to provide a driving current to the operating coil by connecting a first connection node between the first high-side switch and the first low-side switch to a first end of the operating coil and connecting a second connection node between the second high-side switch and the second low-side switch to a second end of the operating coil;

a capacitor circuit configured to have a capacitor value to form a resonance circuit together with the operating coil to resonate at a resonance frequency that is varied based on an inductance value of the operating coil;

a resonance maintaining circuit configured to maintain a level of a resonance signal generated by the operating coil and the capacitor circuit;

a resonance frequency detecting circuit configured to detect a resonance frequency signal from the resonance signal generated by the operating coil and the capacitor circuit; and a control circuit configured to control the driving circuit in response to the resonance frequency signal from the resonance frequency detecting circuit.

9. The apparatus of claim 8, wherein the capacitor circuit is connected in parallel with the operating coil to form the resonance circuit together with the operating coil;

the capacitor circuit comprises a first capacitor and a second capacitor connected to each other in series; and the resonance circuit is configured to generate the resonance signal with a resonance frequency varied based on a change in the inductance value of the operating coil.

10. The apparatus of claim 9, wherein the resonance maintaining circuit comprises a signal amplifier configured to amplify the resonance signal from at least one of a first terminal of the capacitor circuit and a second terminal of the capacitor circuit and output the amplified resonance signal to a capacitor connection node formed between the first capacitor and the second capacitor.

11. The apparatus of claim 9, wherein the resonance maintaining circuit comprises:

a signal amplifier configured to amplify the resonance signal from at least one of a first terminal of the capacitor circuit and a second terminal of the capacitor circuit and output the amplified resonance signal to a capacitor connection node formed between the first capacitor and the second capacitor;

a first switching circuit connected between the first terminal of the capacitor circuit and an input terminal of the signal amplifier and configured to interlock with the first low-side switch; and a second switching circuit connected between the second terminal of the capacitor circuit and the input terminal of the signal amplifier and configured to interlock with the second low-side switch.

12. The apparatus of claim 9, wherein the resonance maintaining circuit comprises:

a signal amplifier configured to amplify the resonance signal from at least one of a first terminal of the capacitor circuit and a second terminal of the capacitor circuit and output the amplified resonance signal to a capacitor connection node formed between the first capacitor and the second capacitor;

a first switching circuit connected between the first terminal of the capacitor circuit and an input terminal of the signal amplifier and configured to interlock with the first low-side switch;

a second switching circuit connected between the second terminal of the capacitor circuit and the input terminal of the signal amplifier and configured to interlock with the second low-side switch;

a first impedance circuit connected between the first connection node and the first low-side switch; and a second impedance circuit connected between the second connection node and the second low-side switch.

13. The apparatus of claim 9, wherein the resonance frequency detecting circuit comprises a frequency counter configured to count a resonance frequency in response to the resonance signal generated by the operating coil and the capacitor circuit and provide a resonance frequency count value as the resonance frequency signal.

* * * * *